US005182945A

United States Patent [19]

Setter

[11] Patent Number: 5,182,945

[45] Date of Patent: Feb. 2, 1993

[54] METHOD AND ARRANGEMENT FOR CHECKING THE CONTROLLABILITY OF A TANK VENTING VALVE

[75] Inventor: Siegfried Setter, Leonberg-Ezach, Fed. Rep. of Germany

[73] Assignee: Robert Bosch GmbH, Stuttgart, Fed. Rep. of Germany

[21] Appl. No.: 762,000

[22] PCT Filed: Feb. 27, 1990

[86] PCT No.: PCT/DE90/00134

§ 371 Date: Sep. 25, 1991

§ 102(e) Date: Sep. 25, 1991

[87] PCT Pub. No.: WO90/11443

PCT Pub. Date: Oct. 4, 1990

[30] Foreign Application Priority Data

Mar. 25, 1989 [DE] Fed. Rep. of Germany ....... 3909887

[51] Int. Cl.[5] ....... G01M 19/00

[52] U.S. Cl. ....... 73/118.1

[58] Field of Search ....... 73/118.1; 123/518, 519, 123/520

[56] References Cited

U.S. PATENT DOCUMENTS

| | | | |
|---|---|---|---|
| 4,748,959 | 6/1988 | Cook et al. | 123/520 |
| 4,794,790 | 1/1989 | Margarit-Metaxa et al. | 73/117.3 |
| 4,831,992 | 5/1989 | Jundt et al. | 123/520 |

*Primary Examiner*—Jerry W. Myracle

*Attorney, Agent, or Firm*—Walter Ottesen

[57] ABSTRACT

A method for checking the controllability of a tank venting valve is described, via which an additional quantity of air charged with fuel vapors can be supplied to the intake area of an internal combustion engine.

In order to carry out this method, quantities in the area of the tank venting valve are measured which change when a throughput quantity passes through the tank venting valve. In this connection, differences of these quantities before and after activation of the tank venting valve are preferably evaluated. If necessary, for example if required by the sensitivity of the sensors used, an execution of the checking can be made dependent on the pressure in the intake area.

10 Claims, 4 Drawing Sheets

TEV: TANK VENTING VALVE

TEV: TANK VENTING VALVE
TE SYSTEM: TANK VENTING SYSTEM

TEV: TANK VENTING VALVE

METHOD AND ARRANGEMENT FOR CHECKING THE CONTROLLABILITY OF A TANK VENTING VALVE

FIELD OF THE INVENTION

The invention is based on a diagnostic method for checking the controllability of a tank venting valve through which an additional quantity of air charged with fuel vapor is passed to the intake of an internal combustion engine.

BACKGROUND OF THE INVENTION

A diagnostic method is already known from U.S. Pat. No. 4,794,790 in which the controllability of a tank venting valve and of an idling regulator is checked. The tank venting valve is arranged in a feedline which connects an intermediate container, which accommodates fuel vapors from a fuel tank, with the intake area of an internal combustion engine. The intermediate container usually contains an activated carbon filter which only permits a particular maximum degree of charge, that is it can only accommodate a maximum quantity of fuel in the form of fuel vapors.

It is therefore necessary to purge the filter regularly. This is usually done by supplying air to the intake area of an internal combustion engine via the activated carbon filter after operating the tank venting valve. Since, the higher the degree of charging of the activated carbon filter the more this additional quantity of air is enriched with fuel, supplying this air to the intake area leads to a falsification of the air/fuel ratio supplied to the internal combustion engine. This must then be compensated by a control loop, a so-called lambda control. Since the control process carried out by the lambda control is normally quite slow, methods were introduced which redetermine precontrol values for the fuel supply during the operation of the internal combustion engine, that is learn adaptively (U.S. Pat. No. 4,831,992). In this method, a distinction is made as to whether an existing tank venting valve is activated or not, the assumption being that the tank venting valve is opened or closed in dependence on the activation.

In carrying out the diagnostic method presented in U.S. Pat. No. 4,794,790, it is assumed that the additional quantity of air which can be supplied by the tank venting valve is enriched so little with fuel vapors that this additional air ($Q_{TEV}$) is comparable to an additional air ($Q_{LLR}$) supplied by the idle actuator. By selectively activating the tank venting valve and the idling control, which can be controlled by an idling regulator, the operability of the tank venting valve and of the idle actuator is concluded from the responses of the idling control and of the lambda control. For the sake of completeness, it should be mentioned that the operability of the associated control chains, which essentially consist of amplifier stages and electrical connecting lines following the activation logic, is also inferred. However, the activation chains will no longer be explicitly mentioned in the text which follows.

SUMMARY OF THE INVENTION

In contrast, the method according to the invention having the characterizing features of the main claim, has the advantage that it operates independently of how much the additional quantity of air which can be supplied via the tank venting valve is enriched with fuel. That is, the diagnostic method can be used at any time, even when the activated carbon filter and, as a result, also the additional air which can be supplied, is highly charged with fuel.

This is the case, for example, when the internal combustion engine has not been in operation for a relatively long time. But it is exactly then, when it is particularly important to know whether the tank venting valve can be activated since an internal combustion engine in the cold condition tends toward malfunctions if the air/fuel ratio supplied to it deviates. In addition, the probability is particularly great that an electromechanically operating tank venting valve no longer functions properly after not having been operated for a relatively long time.

Since quantities are used for the diagnostic method which change with the existing flow of a fuel/air mixture through the tank venting valve and can be measured in the area of the tank venting valve by sensors intended for this purpose, it is not necessary to evaluate responses of the internal combustion engine or of one of its control devices. This means that their operability does not represent a prerequisite for the diagnostic method according to the invention.

It should also be pointed out that in the case of the quantities measured by the sensors, it is sufficient, as a rule, if only the differences of quantities measured at the time before and at the time after activation of the tank venting valve are evaluated.

BRIEF DESCRIPTION OF THE DRAWINGS

Embodiments of the invention are explained in greater detail in the description which follows and are shown in the drawing wherein.

DESCRIPTION OF THE PREFERRED EMBODIMENTS OF THE INVENTION

The basic concept of the present invention consists of carrying out an actuator diagnosis for the area of the tank venting during operation of a motor vehicle and with the engine running, in which a true physical reaction is obtained independently of the air/fuel ratio of the regenerating gas flow of the activated carbon filter. The diagnosis is based on the fact that because of the operation of the tank venting valve, an additional quantity of air is conducted through the activated carbon filter to the intake area of the internal combustion engine and that because of the throughput of this quantity of air, quantities change which are recorded by sensors upstream and downstream of the tank venting valve. As a result, corresponding fault conditions can then be identified.

Figures 1A, 1B:
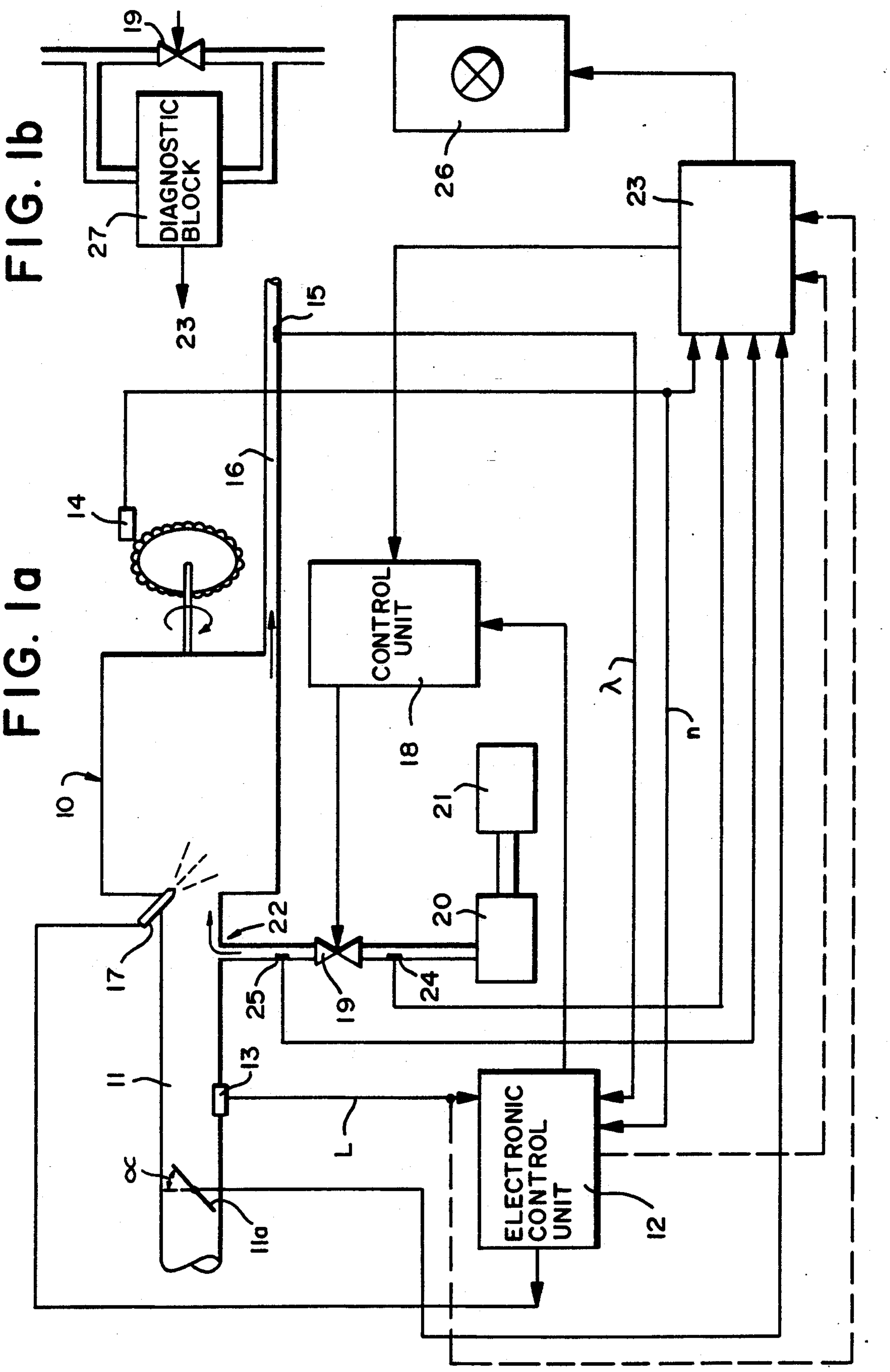
FIG. 1*a* shows a simplified schematic in the form of a block diagram of one possible form of implementation of electronic, electrical and electromechanical closed-loop and open-loop control elements and actuators for operating an internal combustion engine, the area of the tank venting with sensors necessary for first embodiments of the diagnostic method being particularly specified.
FIG. 1*b* shows an enlarged representation of the tank venting valve with its inlet and outlet line and a differential pressure sensor necessary for one embodiment.

Before discussing the invention in the text which follows, it is expressly pointed out that the block diagram in FIG. 1 and specifying the invention with reference to discreet switching stages does not restrict the invention but, in particular, is used for illustrating the functional basic effects of the invention and specifying special functional sequences in one possible form of implementation. Naturally, the individual modules and blocks can be constructed in analog, digital or also hybrid technology. It is also possible that, combined wholly or partially, they can comprise corresponding areas of program-controlled digital systems, for example microcomputers, microprocessors, digital or analog logic circuits and the like. The descriptions given in the text which follows must therefore only be considered as preferred embodiment with respect to the functional overall and time sequence, the effect which is achieved on the respective blocks discussed and with respect to the respective interaction of the part-functions represented by the individual components, the references to the respective circuit blocks being given for reasons of better understanding.

In FIG. 1, an internal combustion engine is identified by 10 and its intake area by 11, in which a throttle flap 11*a* is rotatably journalled. A displacement from the rest position is indicated by the angle $\alpha$. The other components ensuring the operation of the internal combustion engine will be discussed only to the extent required for the understanding of the present invention and for the fundamental relationships.

An electronic control unit 12 which is usually a microcomputer with microprocessor, associated storage, power supply and peripheral transmitters and actuators, receives several operating condition data, at least with respect to:

- the load L of the internal combustion engine 10 from an airflow meter 13 which can be a baffle plate, a pressure gauge, a hot-wire transducer or the like;
- the rotational speed n from a tachometer 14; and,
- the air/fuel ratio supplied to the internal combustion engine, which is determined by the output signal of a lambda probe 15 which is arranged in the exhaust-gas duct 16 and conveys actual-value information as to the particular operating condition of the internal combustion engine, more precisely on the oxygen content in the exhaust gas.

From this data and a large number of other information items supplied such as temperature, air pressure and the like, the electronic control unit 12 generates an output signal which is calculated with high accuracy, in the case of a fuel injection system, for example, an injection control command ti for activating injection valves symbolically shown by 17 in the intake area.

For the tank venting, a control unit 18 is also provided, which is drawn separately for reasons of clarity, which however, can also be a part of the central microcomputer and which activates the tank venting valve 19. The tank venting valve 19 is arranged in a line which leads from an intermediate container 20, which accommodates vapors from a fuel tank 21, to the intake area 11 of the internal combustion engine at point 22.

For carrying out the diagnostic method according to the invention, a diagnostic block 23 is also provided which is shown separately in FIG. 1 but can also be a part of the central microcomputer. This diagnostic block emits a signal via a signal line to the tank venting control unit 18 by means of which the usual tank venting function is switched off and the diagnostic method is initiated. The diagnostic block receives signals from:

- the tachometer 14 with respect to the rotational speed n;
- the throttle flap 11*a* with respect to the displacement $\alpha$;
- a sensor 24 which is arranged in the feedline of the tank venting valve 19; and,
- a sensor 25 which is arranged in the outlet line of the tank venting valve 19.

The sensors 24 and 25 are configured in such a manner that they detect quantities which change when an air/fuel mixture flows through the tank venting valve 19.

Furthermore, the diagnostic block 23 can also receive a signal from the electronic control unit 12 which makes the execution of the diagnostic method possible. Finally, the diagnostic block 23 can also be supplied with a signal with respect to the load L from the airflow meter 13, particularly if the latter is constructed as a pressure gauge.

The diagnostic block 23 comprises, also as part of the microcomputer or of its programming, stores in which the measurement values of the sensors 24 and 25 and results of the diagnosis can be stored and comparison means which can carry out the required comparisons of the measurement signals.

The diagnostic block 23 can also activate a display device 26 which, for example, allows indicating lamps to be lighted depending on the result of the diagnosis. Naturally, this display can be basically implemented in any form, also as letter display and can also indicate intermediate values of the diagnosis.

The operation of the internal combustion engine 10 generates a negative pressure in the intake area 11, that is, a pressure pA which is less than atmospheric pressure and which depends on operating characteristics, such as, for example, the rotational speed n and the displacement $\alpha$ of the throttle flap 11*a*.

Figure 2:
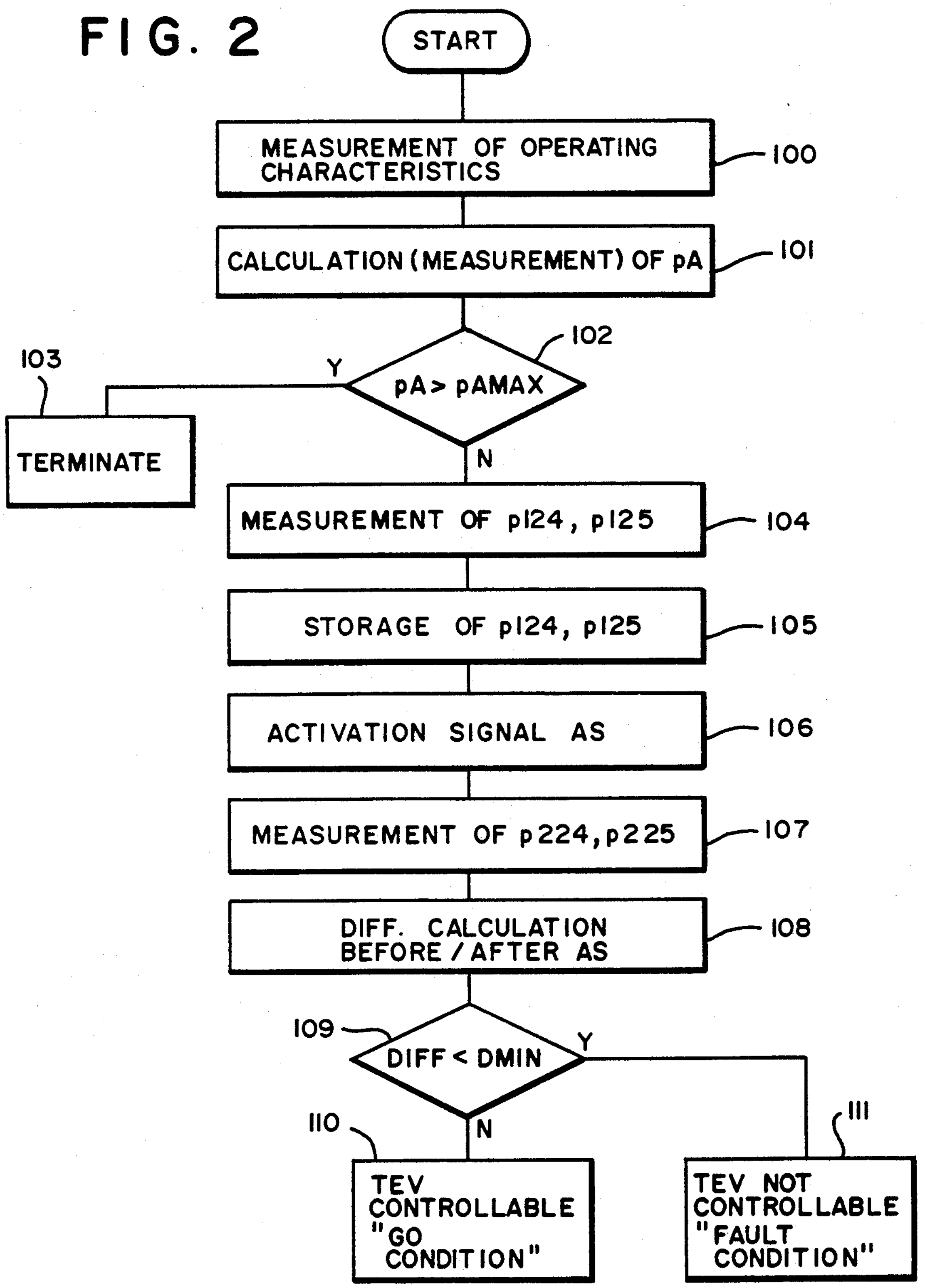
FIG. 2 shows the flow diagram of the diagnostic method with pressure measurement.

In a first embodiment of the present invention, the sensors 24 and 25 are configured in such a manner that they measure the pressure in the inlet and outlet line of the tank venting valve 19. The sequence of the diagnostic method is explained with the aid of FIG. 2.

First operating characteristics are measured on which the pressure in the intake area 11 depends (step 100), such as, the rotational speed n and the set angle $\alpha$ of the throttle flap 11*a*. In step 101, the pressure pA in the intake area 11 of the internal combustion engine 10 is calculated on the basis of the operating characteristics.

Step 100 can also be designed in such a manner that the pressure pA in the intake area 11 is detected via a sensor provided for the purpose; the signal emitted by the sensor can also be used as a measure of the load condition of the internal combustion engine.

In step 102, pA is compared to a maximum permissible pressure pAMAX, which is maximally permissible, for being able to measure a pressure change by the sensors 24 and 25 after activation of the tank venting valve 19. If pA is greater than pAMAX, the diagnostic process is terminated (103). But if pA is less than or equal to pAMAX, the pressures p124 and p125 are measured by the sensors 24 and 25, respectively, in step 104. These values are stored in step 105 and subsequently an activation signal AS is emitted to the tank venting control unit 18 by the diagnostic block 23 (106).

In step 107, pressures p224 and p225 are again measured by the sensors 24 and 25, respectively.

In step 108, the actual evaluation occurs by forming difference values, especially by:

$$p24=p124-p224 \quad (1)$$

$$p25=p125-p225 \quad (2)$$

$$p=(p125-p124)-(p225-p224) \quad (3)$$

In step 109, the pressure differences from at least one of equations (1) to (3) are compared to desired values. If one or if several of these differences are less than associated desired values DMIN, a fault condition is determined in step 111. Thus, DMIN here designates a large number of minimum values with respect to equations (1) to (3).

If the measured differences are greater than the minimum values corresponding thereto, a conclusion is drawn that the tank venting valve 19 can be activated (110), which can be designated as "go condition" here.

The results of the diagnosis (103, 110, 111) can be stored in the store provided for this purpose, which is a part of the diagnostic block 23, and/or can be indicated by the display device 26.

In a second embodiment of the diagnostic method, the sensors 24, 25 are constructed in such a manner that they measure a mass throughflow Q, usually of an air/fuel mixture, flowing through the inlet and outlet line of the tank venting valve.

Figure 3:
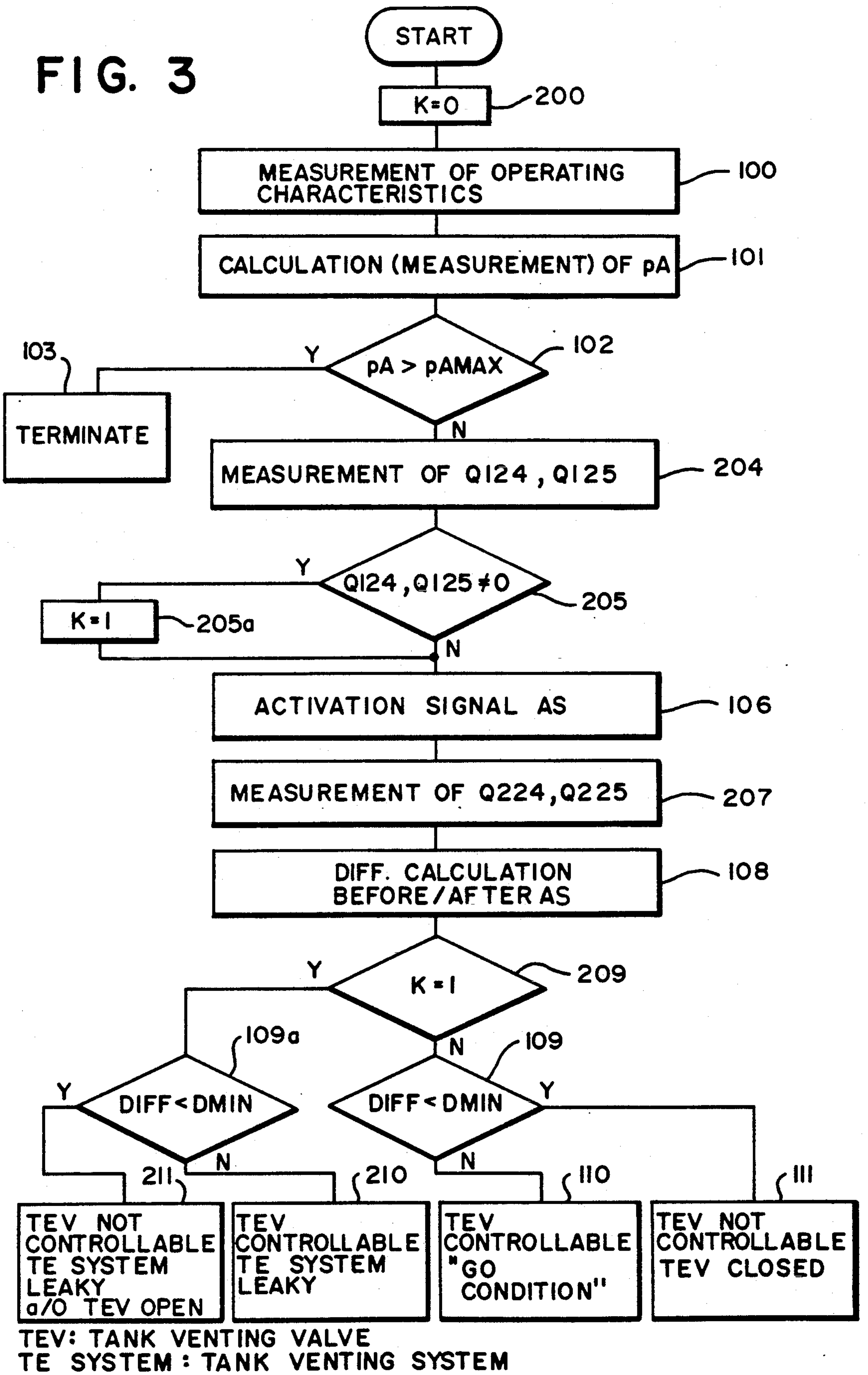
FIG. 3 shows the flow diagram of the diagnostic method with mass throughput measurement; and, FIG. 4 shows the flow diagram of the diagnostic method with differential pressure measurement.

The sequence is explained with the aid of FIG. 3. Here, steps proceeding as in the first embodiment of the diagnostic method are identified exactly like those steps and will be discussed only to the extent necessary for understanding the method.

At the beginning of the method, a variable K=0 is set in step 200.

If it is found in step 102 that the pressure in the intake area is less than or equal to a maximum pressure pAMAX, the mass throughput in the inlet and outlet line of the tank venting valve 19 is measured by the sensors 24 and 25 and the associated values Q124 and Q125 are stored (step 204).

If it is found that this flow has a value which clearly deviates from 0, there is at least a defect in the inlet or outlet line of the tank venting valve or in the tank venting valve itself, in such a manner that the tank venting system is leaking or that the tank venting valve is opened. For a more accurate analysis, a variable K=1 is set in step 205*a* and the process is then continued at step 106.

If no noticeable mass throughput is found in step 205, K=0 remains and the process is continued at step 106.

After another measurement of mass throughputs Q224 and Q225 by the sensors 24 and 25, respectively, after the tank venting control unit 18 has been activated by the diagnostic block 23, differences are calculated in step 108, preferably of:

$$Q24=Q224-Q124 \quad (4)$$

$$Q25=Q225-Q125 \quad (5)$$

In step 209, an interrogation occurs whether the variable is K=1. If yes, that is if Q124 and/or Q125 have a value not equal to 0, the process is continued at step 109*a*.

In this step, the interrogation occurs whether the differences from (3), (4) are less than a predetermined minimum value. If yes, it follows that the tank venting valve cannot be activated and that the tank venting system is leaky and/or the tank venting valve is open (211).

If the interrogation at step 109*a* shows that the differences are greater than or equal to DMIN, this means that the tank venting valve can be activated but that the tank venting system is leaky. This leakiness means that air/fuel mixture passes to the outside of the tank venting system or that the tank venting valve was not completely closed before being activated. An accurate diagnosis which, however, will not be discussed in greater detail, can be obtained in step 210 by selective evaluation of the output signals of the sensors 24, 25.

If, however, the variable K is not equal to 1, the interrogation occurs in step 109 whether differences from the equations (4) and (5) are less than minimum desired values DMIN. If "yes", the tank venting valve cannot be activated and is closed before and after activation by the diagnostic block 23 (111).

If the interrogation at step 109 results in "no", this means that the tank venting system is seal-tight in the area covered by the sensors 24, 25 and that the tank venting valve can be activated.

This means that a "go condition" is concluded in accordance with this embodiment of the diagnostic method.

In the second embodiment of the diagnostic method, DMIN designates minimum values with respect to equations (4) and (5).

The possible results of the diagnostic method (103, 110, 111, 210, 211) can be stored in the store provided for this purpose which is a part of the diagnostic block 23, and/or indicated by the display device (26).

A possible variation of the second embodiment which, however, will not be discussed in greater detail, uses sensors 24, 25 in such a manner that volume rates of flow are measured instead of mass throughputs.

It should be additionally pointed out that the two embodiments of the diagnostic method according to the invention presented above can also be modified in such a manner that one of the two sensors 24, 25 is omitted. Naturally, this correspondingly reduces the number of differences which can be calculated in step 108.

Figure 4:
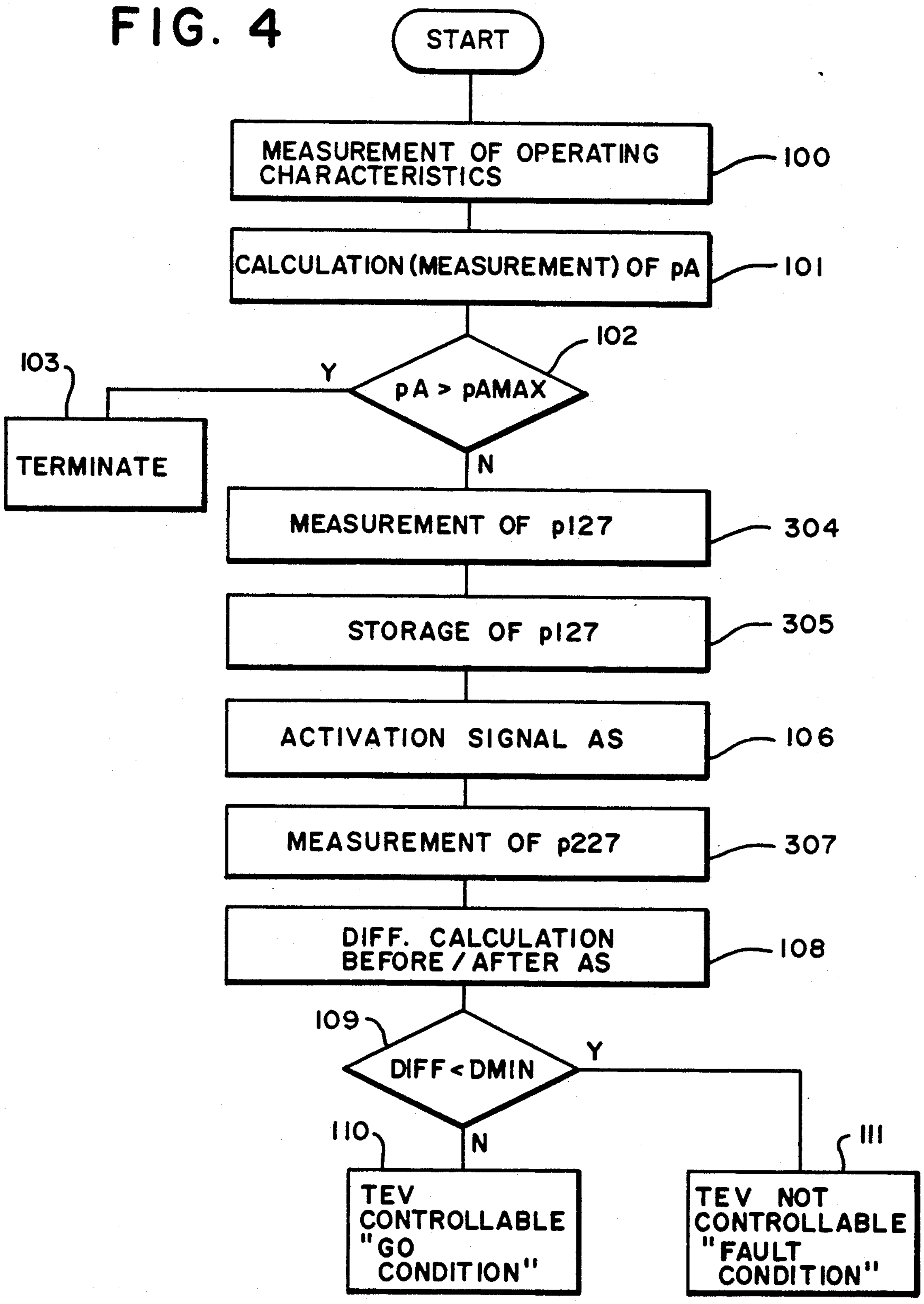

A third embodiment of the diagnostic method uses instead of the two sensors 24, 25 a single sensor 27 (FIG. 1*b*), which emits an output signal to the diagnostic block 23 which is a measure of the differential pressure between the outlet and the inlet line of the tank venting valve 19. The sequence of this embodiment of the diagnostic method is explained with the aid of FIG. 4. Steps proceeding as in the first embodiment of the diagnostic method are designated as in FIG. 2. These will be discussed only to the extent necessary for understanding.

After having found in step 102 a pressure pA which is less than or equal to pAMAX, a measurement of the differential pressure p127 between the outlet and the inlet line of the tank venting valve 19 follows in step 304. The value of this measurement is stored in step 305 and the diagnostic block 23 subsequently (106) outputs an activation signal AS for the tank venting valve to the tank venting control unit 18.

In step 307, the differential pressure is measured again resulting in the value p227.

In step 108, differences are calculated, particularly of:

$$p27 = p227 - p127 \quad (6)$$

and subsequently (109) an interrogation is carried out whether this difference is less than a minimum permissible difference DMIN, DMIN here being related especially to equation (6).

If "yes", the diagnostic method concludes that a fault condition exists in the activation chain of the tank venting valve (111), otherwise ("no") the tank venting valve has responded to the activation signal and a "go condition" is registered (110).

The results from 110 or 111, can subsequently be indicated and/or stored.

The essence of the diagnostic method according to the invention lies in the fact that the controllability of a tank venting valve is checked by measuring quantities in the area of the tank venting valve which change when a flow passes through the tank venting valve.

In this connection, differences of these quantities before and after activation of the tank venting valve are preferably evaluated. If necessary, for example if required by the sensitivity of the sensors used, an execution of the checking can be made dependent on the pressure in the intake area of the internal combustion engine.

The method according to the invention has the advantage, in particular, that it operates independently of internal combustion engine responses and thus does not require any restriction of the air/fuel ratio of the throughput.

I claim:

1. A diagnostic method for checking the controllability of a tank venting valve through which an additional quantity of air charged with fuel vapor is passed to the intake of an internal combustion engine, the tank venting valve having a control chain and an input line and an output line, the method comprising the steps of:

using as measuring signals the output signals of at least one sensor which detects quantities measurable in the inlet and/or outlet line of the tank venting valve with said quantities changing when the additional quantity of air passes through the valve;

when a pregiven activating signal AS is applied to the control chain of the tank venting valve, concluding in dependence upon at least one of said measuring signals that the tank venting valve is controllable and/or that the inlet line and/or outlet line is sealtight; and, checking to determine if the pressure pA present in the intake of the engine is below a maximum permissible value and if yes, then conducting an evaluation of the measuring signal and if said pressure pA is above said maximum permissible value, then omitting the evaluation of said measuring signal.

2. The diagnostic method of claim 1, wherein: in addition to at least one measurement signal with a given activating signal AS, at least one measurement signal is evaluated before emission of the activating signal AS.

3. The diagnostic method of claim 2, wherein at least one difference value of two measurement signals is evaluated before emission of the activating signal and at least one difference value of said two measurement signals is made after said activating signal AS is emitted.

4. The diagnostic method of claim 1, wherein the pressure pA is computed by means of operating characteristic variables of the engine.

5. The diagnostic method of claim 4, wherein said operating characteristic variables include at least the engine speed and the engine load.

6. The diagnostic method of claim 1, wherein the quantities detected by said at least one sensor are pressures in said inlet line and/or said outlet line.

7. The diagnostic method of claim 1, wherein said quantities detected by said at least one sensor are difference pressures between said inlet line and said outlet line.

8. The diagnostic method of claim 1, wherein said quantities detected by said at least one sensor are difference pressures between inlet line and outlet line.

9. An arrangement for carrying out a diagnostic method for checking the controllability of a tank venting valve through which an additional quantity of air charged with fuel vapor is passed to the intake of an internal combustion engine, the tank venting valve having a control chain and an input line and an output line, the arrangement comprising:

means for supplying an activating signal (AS) to said control chain of said tank venting valve;

means for measuring the pressure pA present in the intake of the engine;

means for comparing measured pressure pa with a threshold value and for permitting the diagnosis when said pressure exceeds said threshold value;

means incorporating at least one sensor for detecting quantities in said inlet line and/or said outlet line which change when said additional quantity flows through said tank venting valve;

means for storing the values of said output signal of said at least one sensor and for comparing said values with pregiven values to draw a conclusion as to the functional capability of said control chain; and, means for indicating and storing the results of the diagnostic method.

10. An arrangement for carrying out a diagnostic method for checking the controllability of a tank venting valve through which an additional quantity of air charged with fuel vapor is passed to the intake of an internal combustion engine, the tank venting valve having a control chain and an input line and an output line, the arrangement comprising:

means for supplying an activating signal (AS) to said control chain of said tank venting valve;

means for computing the pressure pA present in the intake of the engine;

means for comparing said pressure pA with a threshold value and for permitting the diagnosis when said pressure pA exceeds said threshold value;

means incorporating at least one sensor for detecting quantities in said inlet line and/or said outlet line which change when said additional quantity flows through said tank venting valve;

means for storing the values of said output signal of said at least one sensor and for comparing said values with pregiven values to draw a conclusion as to the functional capability of said control chain; and, means for indicating and storing the results of the diagnostic method.

* * * * *